Oct. 31, 1972 P. H. S. BERGLUND ET AL 3,701,621
APPARATUS FOR PRODUCING FIBRES OF THERMOPLASTIC MATERIAL
Filed Nov. 23, 1970
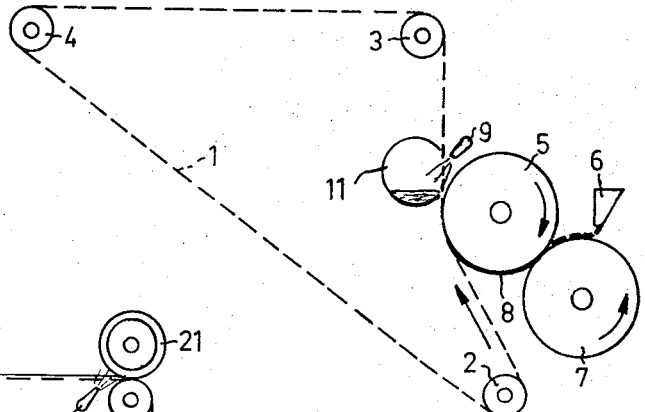
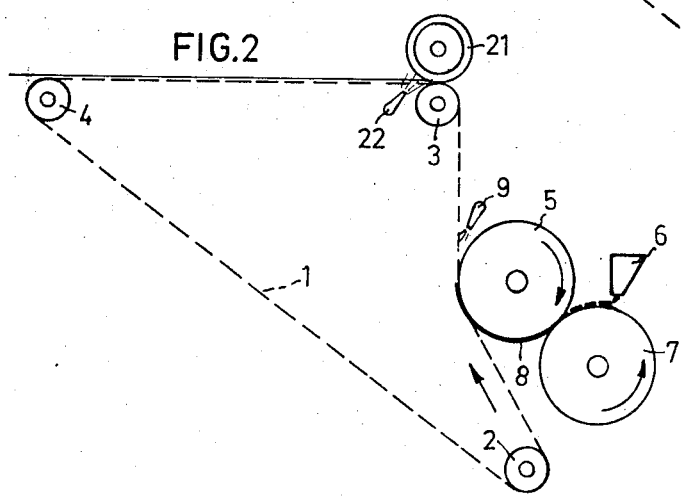
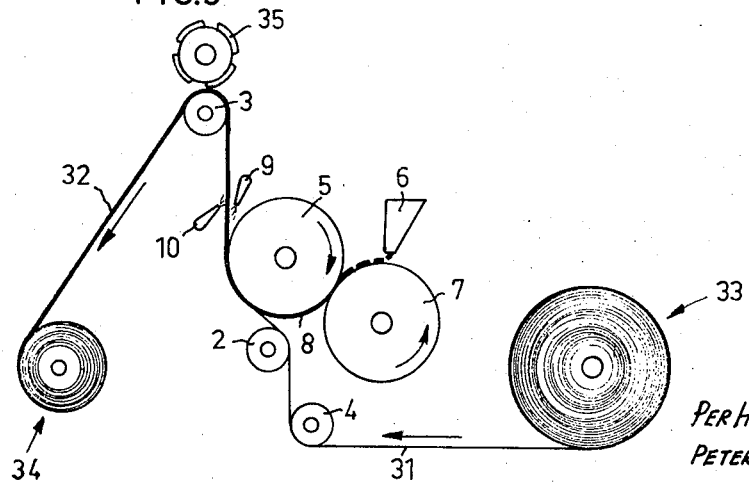
PER HENDRIK SIXTEN BERGLUND
PETER ROBERT FANTO-KURTÖS
NILS ALBERT UNO MATTSON
INVENTORS
BY Young + Thompson
ATTYS.

3,701,621
APPARATUS FOR PRODUCING FIBRES OF THERMOPLASTIC MATERIAL
Per Henrik Sixten Berglund, Floda, Peter Robert Fanto-Kurtos, Vastra Frolunda, and Nils Albert Uno Mattson, Goteborg, Sweden, assignors to Continental Linoleum-Union-Betriebs AG, Zurich, Switzerland
Filed Nov. 23, 1970, Ser. No. 91,632
Claims priority, application Sweden, Nov. 24, 1969, 16,124/69
Int. Cl. B29c 17/14
U.S. Cl. 425—115                    11 Claims

ABSTRACT OF THE DISCLOSURE

Thermoplastic fibres are produced by heating a layer of thermoplastic material by passing it between a heated roll and a web or belt. This passage simultaneously shreds the fibres, which are thereafter cooled and collected.

---

The present invention relates to an apparatus for producing fibres by shredding and cooling a layer of thermoplastic material heated to melting temperature. Such an apparatus includes means for advancing and shredding the layer of the thermoplastic material and means for heating and cooling the same.

A proposed apparatus of the type referred to mainly consists of two carriers in the form of endless belts or webs having non-sticking surfaces, for example surfaces of silicon or polytetrafluoroethylene (Teflon®). The belts are guided by two pairs of rolls. By means of one of said pairs of rolls is created a nip between the belts, the belts consisting of a Teflon treated glass fabric. The fibres are produced on the exit side of the nip, where the layer of plastic material, inserted between the belts and there heated to melting temperature by means of said one pair of rolls—which is heated—is shredded between the two belts or webs into fibres. A gaseous medium under a pressure above atmospheric is then passed to the exit side of the nip to cool the fibres of thermoplastic material and thereby fixate the fibre structure. The desired fibre length can be otained by adjusting the distance between the two rolls in the other stand of rolls and thereby the angle at which the belts separate from each other at the nip. If the fibres are not intended to form staple goods but are to form instead a pile, fell or the like, the fibres are applied immediately to a web of material which is to form the backing supporting the pile or fell and which accompanies one of the two endless belts.

The proposed apparatus, however, is encumbered with a number of disadvantages. Among other things, the endless belt passing around the heatable rolls prevents heat from flowing to the thermoplastic material to be heated. Moreover, it is extremely difficult in practice to produce endless belts whose joints do not impair the quality of the fibres and leave a transversally extending mark on the pile or fell each time the joints pass the nip. Teflon treated glass fabric is also very expensive and hitherto can only be manufactured in widths of slightly above one meter. The useful life of these belts is also extremely short since the temperatures in which they are used are necessarily high, around 260° C., in order that the thermoplastic material is heated to its melting temperature thereof. As a result of their low coefficient of friction, the non-stick belts also present technical difficulties with respect to the task of guiding and driving of the belt, particularly in the case of Teflon treated glass fabric belts.

The object of the present invention is to avoid the aforementioned disadvantages and to provide an apparatus of the type referred to which has a greater productive capacity of both fibres and pile and which enables a pile or fell to be patterned in connection with its manufacture and to form directly a non-woven material from the fibres created. This object is fully realized by the apparatus of the invention, which is maintainly characterized in that the means for advancing and shredding the layer of thermoplastic material into fibres and for heating said layer are one and the same and consists of a driven roll and a driven conveying web, the conveying web being arranged to engage the roller, which is capable of being heated, to permit insertion of the layer of thermoplastic material between the roller and the conveying web when these are brought together and to fiberize the material when the roll and the conveying web are moved out of engagement with one another at which point the cooling means, which may be of a known type, are operable. Because of the construction of the apparatus according to the invention, neither the fibres nor the pile or fell carrying material are affected by the belt joints in the nip between the two endless belts, as with the previously known apparatus. The abutment pressure between the driven roll and the driven conveying web or belt can be kept relatively low with the apparatus of the present invention, and thus the danger of tearing the material when using thin webs of material for manufacturing pile is far less than when the thermoplastic material is applied in the nip of two abutting endless belts. Moreover, temperature control is effected much more easily.

In a particularly preferred embodiment of the apparatus according to the invention intended for producing staple fibres or non-woven material, the conveying web is endless and consists of a net structure, a perforated foil or the like of a material which does not prevent release of the fiberized thermoplastic material when the fibres are cooled. If the fibres are to be used for staple goods, the appaartus of the invention is complemented with means for collecting the fibres are to be used for staple goods, the apparatus of appropriate construction, is preferably located in the region where the roll and the conveying web separate. On the other hand, if the production of a non-woven material is intended, known heatable embossing means can be used with the apparatus of the invention behind the point where the roll and the conveying web separate. The embossing means interlock the fibres to form a coherent non-woven batt or web of fibre material. In this connection, fibre collecting means are not required and the fibres accompany the conveying web to the embossing means.

In another particularly preferred embodiment of the apparatus according to the invention, with which the produced fibres are applied to a carrier material to form a pile or fell, the apparatus is mainly characterized in that the driven conveying web is arranged to pass successively into the pile or fell to form the carrier material thereof. This is of great advantage in the manufacture of pile or fell since the pile carrier can then comprise a relatively cheap material. For example, the carrier material may be formed of non-woven material. These materials are extremely light and adaptable and therefore particularly suitable. Moreover, foam rubber or foam plastic can be used as the carrying material web. All of the aforementioned conveying materials also have the advantage of being permeable to gas, which is important in the manufacture of pile since cooling means may then also be arranged on the side of the web remote from the heatable roll cooperating therewith. Furthermore, both textile and metallic material may be in the form of a web and in sheet or plate form.

If it is desired to emboss the produced pile or fell with a pattern, the apparatus according to the invention can be complemented with known embossing means which are installed behind the point where the roll and the conveying web separate from each other.

It has been established experimentally that the said roll of the apparatus can to advantage comprise a metallic material. It has been found of particular advantge, however, to permit the roll in question to cooperate with a second heatable roll and to introduce by suitable means granulated, powdered or paste-like plastic material between the rolls, which themselves form in the nip between them the requisite layer of thermoplastic material for manufacturing the fibres. Since the thermoplastic material is not supplied to the apparatus in the form of a finished film or melt, it is relatively simple to adjust the production of the thermoplastic material layer to the production of the fibres. Moreover, greater selectability is afforded with respect to the thermoplastic material as a result of the improved heat transfer conditions.

As with the first mentioned roll, the second roll may also advantageously consist of a metallic material.

The invention will now be described in detail with reference to three embodiments thereof illustrated diagrammatically in the accompanying drawings, in which FIG. 1 illustrates an embodiment of the apparatus according to the invention intended for manufacturing staple fibres, and FIGS. 2 and 3 illustrate embodiments intended for producing non-woven material and a pile provided with a flexible material backing, respectively.

In FIG. 1 the reference numeral 1 indicates a driven endless web or belt comprising a metal wire net structure. The web or belt passes over a number of direction changing rollers 2, 3, 4, of which at least one is a driven roll. Between two of the direction changing rollers (2 and 3) the web or belt 1 is arranged to engage a portion of the periphery of a heatable, driven metallic roll 5. The pressure at which the web or belt 1 engages the roll 5 is adjusted by pre-setting the positions of the direction changing rollers 2 and/or 3 which thus determines the tension in the belt 1, thereby providing the desired abutment pressure.

The layer of thermoplastic material to be fiberized is produced with the embodiment illustrated in FIG. 1 by supplying to the periphery of a second, heatable metallic roll 7 through a dispensing means 6 a granulated, powdered or paste-like thermoplastic material, the second roll 7 being arranged to cooperate with the roll 5 and pre-heat the granulate, powder or paste which, when passing the nip between the two rolls 5 and 7, melts and forms a film 8. With the correct temperature setting and friction relationship between the two rolls, the film will accompany the periphery of the roll 5 in between said roll and the web or belt 1 at the point where these engage each other. When the web or belt 1 and the roll 5 separate from each other, the film or layer 8 heated to melting temperature will adhere to both the roll and the web or belt and is consequently shredded into filaments which adhere at one end to the roll and at the other end to the belt. In order to stabilize these filaments into fibres and to cause them to be released from the roll and the web or belt, a pressurized gaseous medium is applied thereto. In the illustrated embodiment, this is effected by means of a compressed air nozzle 9 which operates within the sector where the web or belt 1 passes out of engagement with the roll 5.

An arrangement 11 for collecting the produced fibres is arranged in the vicinity of the point where the roll 5 and the web or belt 1 separate from each other. The collecting means 11 may be of any appropriate construction.

Although the conveying web or belt 1 in the embodiment illustrated in FIG. 1 has the form of a metal wire net structure it may also be in the form of a perforated metal foil, or a net or foil or similar structure of any material whatsoever, provided that the fiberized thermoplastic material releases therefrom when cooled and provided that the material is sufficiently strong and temperature resistant for the purpose intended. This is also true of the material from which the rolls 5 and 7 are made.

In the embodiment illustrated in FIG. 2, the embodiment described with reference to FIG. 1 for manufacturing staple fibres is modified so that a non-woven material can be produced directly from the successively manufactured fibres. For this purpose there is arranged an embossing roll 21 which cooperates with the direction changing roller 3 located nearest the point at which the belt 1 passes out of engagement with the roll 5. The embossing roll is profiled and capable of being heated so that in abutment with the belt 1 supported by the direction changing roller 3 it causes the fibres, which in this instance accompany the belt, to bind together to form a coherent non-woven fibre material web by melting said fibres locally. By supplying a pressurized gaseous medium, for example compressed air, from a nozzle 22, the produced non-woven material is stabilized at the same time as the fibres are caused to be released from the belt 1 and the embossing roll 21 as a result of the cooling.

With this embodiment, cooling of the fibre forming filaments is effected at the actual fibre-producing zone, i.e. at the exit from the nip between the roll 5 and the web or belt 1, particularly with the intention of ensuring that the fibres, in addition to being stabilized, are released from the roll 5 while still adhering the belt 1 to an extent sufficient to accompany the same to the embossing station. Consequently, no fibre collecting means are required with this embodiment.

The embossing roll 21 may be of any appropriate type.

The embodiment of the apparatus according to the invention illustrated in FIG. 3 is intended for manufacturing a pile, fell or the like comprising a carrier material onto which the fibres produced in the apparatus are applied. In the figure, the reference numeral 31 indicates a driven web of a carrying material on which the fibres, produced by shredding and cooling the layer 8 of thermoplastic material heated to melting temperature, can be applied to form a pile or fell 32. The carrying material web 31 is unwound from a supply reel 33 and passes as the driven web of the apparatus according to the invention over the direction changing rollers 2, 3 and 4. The web abuts the roll 5 between the direction changing rollers 2 and 3 and is joined there with the molten thermoplastic material in the film 8. When the material web 31 and the roll 5 separate from each other and the thermoplastic material is shredded into filaments, the said material adheres stronger to the web 31 than to the roll 5 and consequently, subsequent to being cooled, the stabilized fibres are stuck at one end to the web while the other end of the fibres is released from the roll. The pile 32 thus formed and with which the web 31 actively driven in the apparatus successively forms the backing material, is progressively coiled onto a roller 34 or can be handled in some other way.

If it is desired to pattern the pile or the fell by embossing, this can be accomplished by arranging a known heatable embossing roll 35 to cooperate with the nearest direction changing roller behind the pile producing zone.

The invention is not restricted to the described and illustrated embodiments but can be modified within the scope of the following claims.

What we claim is:

1. In an apparatus for manufacturing fibres by shredding and cooling a layer of thermoplastic material heated to melting temperature, comprising means for advancing and shredding the thermoplastic material layer and means for heating and cooling said layer; the improvement in which said means for advancing and shredding the thermoplastic material layer comprises a heatable driven roll and a driven web or belt which abuts the roll with the thermoplastic material layer introduced between the roll and the web or belt and said layer being shredded into fibres by the layer adhering to both the roll and the web or belt and breaking away therefrom at the point where the roll and the web or belt pass out of engagement with each other, and cooling means adjacent said point for cooling said fibres.

2. An apparatus according to claim 1, characterized in that the web or belt is endless and consists of a net structure, a perforated foil or the like, and being of a material from which the thermoplastic material shredded to fibre form is released when cooled.

3. An apparatus according to claim 1, characterized in that known heatable embossing means are arranged behind the point where the roll and the web or belt move out of engagement with each other for the purpose of locally interlocking the fibres into a coherent, non-woven fibre material batt or web.

4. An apparatus according to claim 1, characterized in that said apparatus also includes means for collecting fibres, said collecting means being arranged in the proximity of the point at which the roller and the web or belt pass out of engagement with each other.

5. An apparatus according to claim 1, in which the fibres are applied to a carrying material to form a pile or fell, characterized in that the conveying web or belt of the apparatus is a driven web which is arranged to successively form the carrying material of the pile or fell to be produced.

6. An apparatus according to claim 5, characterized in that the web comprises a successively advanced web, sheet or plate material.

7. An apparatus according to claim 5, characterized in that known embossing means are arranged behind the point where the roller and the web pass out of engagement with each other for the purpose of forming a pattern or the like on the pile or the fell.

8. An apparatus according to claim 1, characterized in that the roll comprises a metallic material.

9. An apparatus according to claim 1, characterized in that cooling means are arranged to operate on the side of the driven web remote from the roll.

10. An apparatus according to claim 1, characterized in that a second, heatable roll is arranged to cooperate with the first mentioned roll and that means are provided for supplying granulated, powdered or paste-forming plastic material between the rolls so as to form the layer or thermoplastic material in the nip between said rolls.

11. An apparatus according to claim 10, characterized in that the second roll comprises a metallic material.

References Cited

UNITED STATES PATENTS

| | | | |
|---|---|---|---|
| 2,830,648 | 4/1958 | Haddox | 264—119 X |
| 2,931,421 | 4/1960 | Schuller | 18—2.5 X |
| 3,180,911 | 4/1965 | Muller | 264—119 |
| 3,528,129 | 9/1970 | Hartmann | 18—2.5 RX |

ROBERT L. SPICER, Jr., Primary Examiner

U.S. Cl. X.R.

264—119; 425—289